(12) United States Patent
Minami

(10) Patent No.: US 7,661,402 B2
(45) Date of Patent: *Feb. 16, 2010

(54) MULTIPOINT IGNITION ENGINE

(75) Inventor: Katsuaki Minami, Nagano (JP)

(73) Assignee: Miyama, Inc., Nagano (JP)

( * ) Notice: Subject to any disclaimer, the term of this patent is extended or adjusted under 35 U.S.C. 154(b) by 59 days.

This patent is subject to a terminal disclaimer.

(21) Appl. No.: 11/640,992

(22) Filed: Dec. 19, 2006

(65) Prior Publication Data

US 2007/0209634 A1   Sep. 13, 2007

(30) Foreign Application Priority Data

Mar. 7, 2006  (JP)  ............. 2006-060884
Nov. 20, 2006  (JP)  ............. 2006-312431

(51) Int. Cl.
  *F02P 23/00*  (2006.01)
  *F02P 15/06*  (2006.01)

(52) U.S. Cl. ............. 123/143 B; 123/169 MG

(58) Field of Classification Search ............. 123/143 B, 123/169 MG, 169 EL, 634–636, 647, 309, 123/310

See application file for complete search history.

(56) References Cited

U.S. PATENT DOCUMENTS

| | | | | |
|---|---|---|---|---|
| 4,436,068 A | * | 3/1984 | Nakamura et al. | 123/310 |
| 4,470,392 A | * | 9/1984 | Yoshinaga et al. | 123/310 |
| 4,535,735 A | * | 8/1985 | Yoshinaga et al. | 123/310 |
| 5,046,466 A | * | 9/1991 | Lipski | 123/310 |
| 5,465,695 A | | 11/1995 | Yamamoto et al. | |
| 6,161,520 A | * | 12/2000 | Clarke | 123/310 |
| 6,807,933 B2 | * | 10/2004 | Lipski | 123/169 EL |
| 7,299,785 B1 | * | 11/2007 | Lee | 123/310 |
| 7,441,526 B1 | * | 10/2008 | Minami | 123/169 MG |
| 7,441,539 B1 | * | 10/2008 | Minami | 123/310 |
| 7,441,540 B1 | * | 10/2008 | Minami | 123/310 |
| 7,448,356 B1 | * | 11/2008 | Minami | 123/310 |
| 2004/0084001 A1 | | 5/2004 | Lipski | |

FOREIGN PATENT DOCUMENTS

| | | |
|---|---|---|
| EP | 0 449 308 A1 | 10/1991 |
| FR | 2 831 604 | 5/2003 |
| JP | 57-148020 | 9/1982 |
| JP | 57-148021 | 9/1982 |
| JP | 57-185689 | 11/1982 |
| JP | 58-175279 | 10/1983 |

(Continued)

*Primary Examiner*—Hai H Huynh
(74) *Attorney, Agent, or Firm*—Rabin & Berdo, P.C.

(57) ABSTRACT

A multipoint ignition engine (1) includes a central electrode pair (9), disposed in the center of a combustion chamber (2), for forming a central spark gap (10), and a plurality of peripheral electrode pairs (12) held in a head gasket (15), which has an opening portion having a substantially identical diameter to an opening portion of a cylinder (5) in a position corresponding to the opening portion of the cylinder (5), for forming a plurality of peripheral spark gaps (13) around the inner periphery of the opening portion in the cylinder (5). An air-fuel mixture in the combustion chamber (2), which is obtained by mixing together fuel and air evenly to the stoichiometric air-fuel ratio or a richer/leaner air-fuel ratio than the stoichiometric air-fuel ratio, is ignited using both the central spark gap (10) and the plurality of peripheral spark gaps (13).

33 Claims, 13 Drawing Sheets

FOREIGN PATENT DOCUMENTS

| | | |
|---|---|---|
| JP | 59-180067 | 10/1984 |
| JP | 1-35083 | 2/1989 |
| JP | 1-193080 | 8/1989 |
| JP | 01-193080 | 8/1989 |
| JP | 2-123281 | 5/1990 |
| JP | 02-123281 | 5/1990 |
| JP | 02-238176 | 9/1990 |
| JP | 2-238176 | 9/1990 |
| JP | 06-288331 | 10/1994 |
| JP | 07-12037 | 1/1995 |
| JP | 08-045754 | 2/1996 |
| JP | 11-204357 | 7/1999 |
| JP | 2001-012337 | 1/2001 |

* cited by examiner

MULTIPOINT IGNITION ENGINE

FIELD OF THE INVENTION

This invention relates to a multipoint ignition engine having a plurality of spark gaps in relation to a single combustion chamber.

BACKGROUND OF THE INVENTION

In a spark ignition engine, an air-fuel mixture in a combustion chamber is ignited by a spark plug, and conventionally, the spark plug is ideally attached to the center of the combustion chamber. When ignition is performed in the center, the resulting flame propagates concentrically from the center toward the periphery.

Having approached the periphery, however, the flame is cooled by the wall surface of the combustion chamber and may be extinguished as a result. If the flame is extinguished, unburned gas is discharged as is through an exhaust valve. When the excess air ratio is approximately 1.7, for example, the fuel concentration of the air-fuel mixture in a cylinder is approximately 90,000 ppm, and when the flame is extinguished on the peripheral portion, the amount of hydrocarbon discharged in an unburned state during a low load operation may exceed 7,000 ppm. Accordingly, no less than 8% of the fuel is wastefully discharged. Moreover, the amount of HC and CO discharged in the exhaust gas increases, thereby worsening the exhaust performance.

Hence, the applicant has investigated a method of disposing a plurality of spark gaps around a cylinder opening portion and performing ignition from the periphery of the combustion chamber, where the flame is more likely to be extinguished. According to this method, the flame propagates from the plurality of peripheral spark gaps toward the center, and thus the air-fuel mixture in the combustion chamber can be burned rapidly and flame extinction on the peripheral portion can be suppressed. Moreover, by reducing the combustion time, the ignition timing, which is conventionally before top dead center, can be retarded, whereby loss that is generated when the rising piston is pushed back down by the explosion can be suppressed. As a result, the output and fuel efficiency of the engine can be improved.

As a result of a search conducted by the applicant into techniques for performing ignition using a plurality of spark gaps disposed on the periphery of a combustion chamber, JP57-185689A and JP58-175279A were found.

SUMMARY OF THE INVENTION

However, it has been learned that with a method of performing ignition using a plurality of spark gaps disposed on the periphery of a combustion chamber, the flames begin to interfere with each other as they propagate from the periphery to the center, leading to a reduction in propagation speed, and therefore the expected rapid combustion cannot be realized.

This invention has been designed in consideration of these technical problems in the background art, and it is an object thereof to realize rapid combustion in a spark ignition engine, and thereby improve the output and fuel efficiency of the engine.

A multipoint ignition engine according to this invention includes a central electrode pair, disposed in the center of a combustion chamber, for forming a central spark gap, and a plurality of peripheral electrode pairs held in an insulating member, which has an opening portion having a substantially identical diameter to an opening portion of a cylinder in a position corresponding to the opening portion in the cylinder, for forming a plurality of peripheral spark gaps around the inner periphery of the opening portion in the cylinder. An air-fuel mixture in the combustion chamber, which is obtained by mixing together fuel and air evenly, is ignited using both the central spark gap and the plurality of peripheral spark gaps.

According to this invention, the evenly mixed air-fuel mixture is ignited using both the central spark gap and the plurality of peripheral spark gaps, and therefore the air-fuel mixture can be burned rapidly. Since rapid combustion is possible, ignition can be performed at a timing that is closer to the top dead center position than that of a conventional engine, and therefore loss that is generated when the rising piston is pushed back down by the explosion can be suppressed. As a result, the output and fuel efficiency of the engine can be improved.

The details as well as other features and advantages of this invention are set forth in the remainder of the specification and are shown in the accompanying drawings.

DESCRIPTION OF THE PREFERRED EMBODIMENTS

First Embodiment

Figure 1:
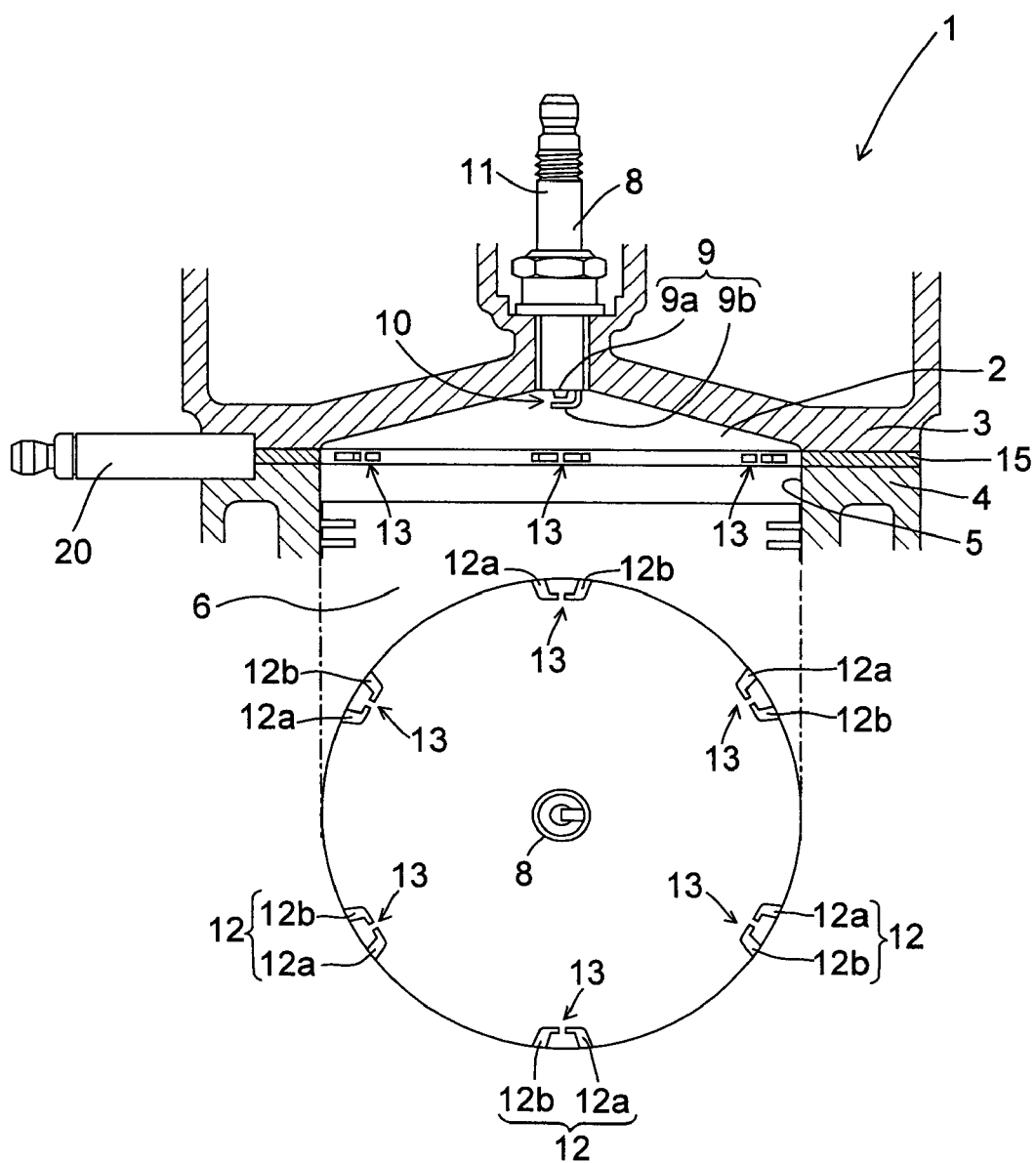
FIG. 1 is a schematic diagram of a multipoint ignition engine according to this invention.

FIG. 1 shows the schematic constitution of a multipoint ignition engine 1 according to this invention.

In this embodiment, an engine 1 is a premix engine in which fuel injected through an injector attached to an intake port, not shown in the drawing, is mixed evenly with air, whereupon the air-fuel mixture is introduced into a combustion chamber 2, ignited by spark ignition, and burned. To obtain a desired air-fuel ratio, an intake air amount and the amount of fuel injected by the injector are adjusted. As will be described below, the engine 1 may be a direct injection engine. To improve the fuel efficiency, the air-fuel ratio of the air-fuel mixture is set higher than the stoichiometric air-fuel ratio (at an excess air ratio of approximately 2, for example), but to ensure the output of the engine 1, the air-fuel ratio of the air-fuel mixture may be set equal to or smaller (richer) than the stoichiometric air-fuel ratio depending on the operating region or in the entire operating region.

The combustion chamber 2 is formed by a pent roof-shaped indentation on the bottom surface of a cylinder head 3. A squish area for generating a gas flow is not provided in the combustion chamber 2, because, as will be described below, in the multipoint ignition engine according to this invention, there is no need for a gas flow to increase the combustion speed and such a gas flow may rather cause cooling loss. Further, a cylinder block 4 has a cylinder 5 positioned so as to face the combustion chamber 2, and a piston 6 is accommodated in the cylinder 5.

A spark plug 8 is screwed into the cylinder head 3 from the upper side thereof. The tip end of the spark plug 8 is exposed in the center of the combustion chamber 2, and a conducting electrode 9a and an earth electrode 9b (to be referred to hereafter as a "central electrode pair 9") protrude into the combustion chamber 2 from the tip end of the spark plug 8. The earth electrode 9b is bent into an L shape, and a spark gap (to be referred to hereafter as a "central spark gap 10") is formed by causing the side face of the earth electrode 9b to face the conducting electrode 9a with a gap therebetween. A base portion of the spark plug 8 serves as a terminal (to be referred to hereafter as a "central terminal 11"), and is connected to an ignition coil, not shown in the drawing.

Meanwhile, a plurality of conducting electrodes 12a and earth electrodes 12b (to be referred to hereafter as "peripheral electrode pairs 12") are disposed on the periphery of an opening portion in the cylinder 5 such that a plurality of spark gaps (to be referred to hereafter as "peripheral spark gaps 13") are disposed at equal intervals in the circumferential direction. The peripheral spark gaps 13 are formed by causing the tip end surfaces of the electrodes 12a, 12b respectively constituting the peripheral electrode pairs 12 to face each other. The base portions of the peripheral electrode pairs 12 are held by a head gasket 15 interposed between the cylinder head 3 and the cylinder block 4. The peripheral electrode pairs 12 protrude into the inside of the cylinder opening portion, and therefore the radius of a circle passing through the peripheral spark gaps 13 is smaller than the radius of the cylinder 5.

A highly heat-resistant metal having such as nickel or platinum is used as the material of the peripheral electrode pair 12, similarly to the material used for the electrodes of the pre-existing spark plug of the engine. Alternatively, iridium, which is highly durable, may be used as the material of the peripheral electrode pair 12. In so doing, the tip ends of the two electrodes can be narrowed, enabling an improvement in the discharge property of the peripheral spark gap 13.

Figure 2:
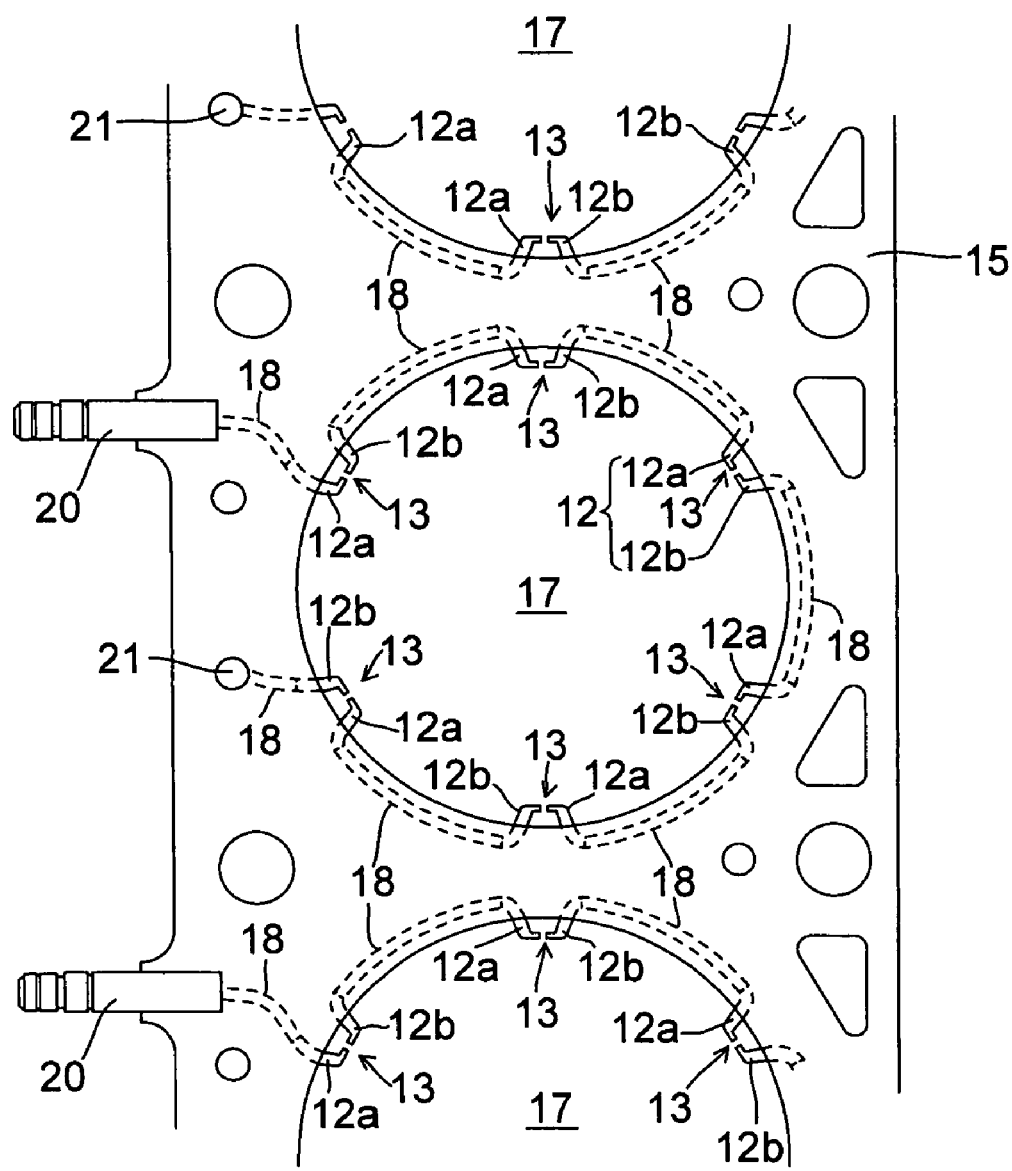
FIG. 2 is a view showing the structure of a head gasket.

FIG. 2 shows the structure of the head gasket 15.

An opening portion 17 having a substantially identical diameter to (either identical to or slightly larger than) that of the opening portion in the cylinder 5 is formed in the head gasket 15 in a position corresponding to the opening portion in the cylinder 5. A plurality of conductive members 18 are buried in the head gasket around the opening portion 17. The conductive member 18 is formed from a different material to the peripheral electrode pair 12, i.e. from a highly conductive material such as copper.

The conducting electrodes 12a and earth electrodes 12b constituting the plurality of peripheral electrode pairs 12 are joined to the end portions of the conductive members 18 such that the plurality of peripheral electrode pairs 12 are electrically connected in series by the conductive members 18. One end of the series is connected to a terminal (to be referred to hereafter as a "peripheral terminal 20"), and the other end is connected to an earth terminal 21.

The peripheral terminal 20 is formed by molding the end portion of the conductive member 18 furthest toward the peripheral terminal 20 side using a cylindrical insulator. As shown in FIG. 1, the peripheral terminal 20 is accommodated inside grooves formed respectively in the cylinder head 3 and cylinder block 4, and is held tightly in this state by being sandwiched between the cylinder head 3 and cylinder block 4.

The peripheral terminal 20 is connected to the ignition coil, not shown in the drawing. To reduce the effects of radio wave noise, resistance of approximately 5 kΩ may be inserted between the conductive member 18 furthest toward the peripheral terminal 20 side and the peripheral terminal 20.

The sum total of the width of the peripheral spark gaps 13 is set at a value approximately 1.5 times greater than a value obtained by dividing a width at which a spark can be generated with stability by a single gap, by the number of peripheral spark gaps 13. For example, assuming that the width at which a spark can be generated with stability by a single gap in a compressed air-fuel mixture is 3 mm, and that six peripheral spark gaps 13 are provided, the width of each peripheral spark gap 13 is approximately 0.8 mm.

Figure 3:
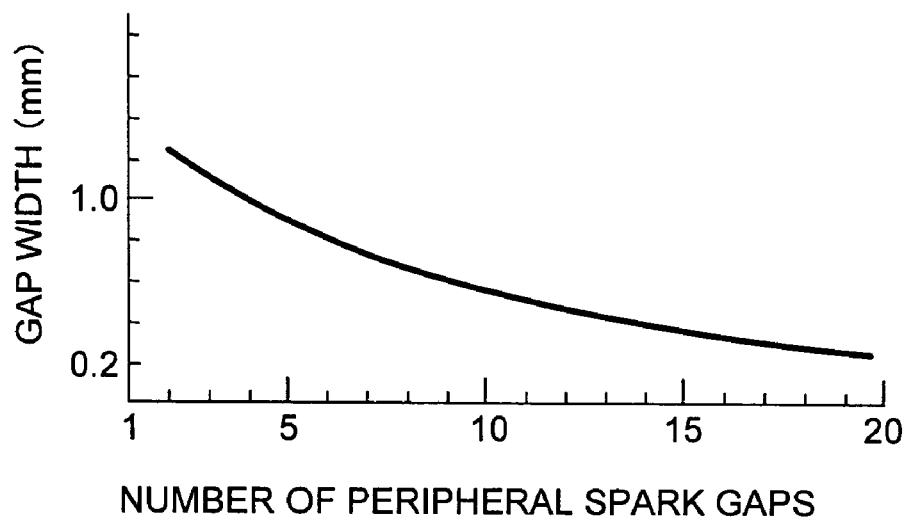
FIG. 3 is a view showing the relationship between a number of peripheral spark gaps and a gap width at which a spark can be generated with stability.

FIG. 3 shows the relationship between the number and width of the peripheral spark gaps 13 at which stable discharge is possible in air when the energy of a secondary current that can be supplied by the ignition coil is 45 mJ. As the number of peripheral spark gaps 13 increases, the width must be reduced to ensure that a spark is generated. For example, when two peripheral spark gaps 13 are provided, a spark is generated at a width of 1.2 mm, but when the number of peripheral spark gaps 13 rises to twenty, 0.2 mm is the limit at which a spark is generated. These data relate to a case in which discharge is performed in air, and under the actual high pressure in the combustion chamber 2, the width of the peripheral spark gap 13 at which discharge is possible decreases even further. The width of the peripheral spark gap 13 may be increased by increasing the capacitance of the ignition coil, but this increases the possibility of leakage from the peripheral spark gap 13 in the vicinity of the ignition coil.

The width of the peripheral spark gap 13 preferably increases steadily toward the peripheral spark gap 13 near the earth terminal 21 side. In so doing, a breakdown voltage (capacitive component) of the peripheral spark gap 13 near the peripheral terminal 20 can be lowered and the duration (inductive component) can be extended, enabling a reduction in the possibility of leakage from the peripheral spark gap 13 in the vicinity of the peripheral terminal 20.

Meanwhile, the heat value (the ease with which heat escapes) of an ignition device constituted by the plurality of peripheral electrode pairs 12 is adjusted by adjusting the length of the conductive member 18. More specifically, by increasing the length of the conductive member 18, the heat of the peripheral electrode pair 12 becomes more likely to escape to the cylinder head 3 and cylinder block 4 via the conductive member 18 and the head gasket 15, and therefore the heat value of the ignition device increases. The length of the conductive member 18 is preferably modified such that the temperature of the peripheral electrode pair 12 is held within a range of 500° C., at which a self-cleaning action is obtained, and 850° C. (or at most 1000° C.), at which abnormal combustion can be avoided easily.

Here, the heat value is adjusted by adjusting the length of the conductive member 18, but the heat value may be adjusted by modifying the thickness (the sectional area, or in the case of a circular cross-section, the diameter), the width (the dimension in a perpendicular direction to the lengthwise direction, including the thickness), and the material of the conductive member 18 in addition to, or instead of, adjusting the length of the conductive member 18.

The head gasket 15 has to prevent leakage between the peripheral spark gap 13 and the cylinder head 3, the cylinder block 4, or the crown surface of the piston 6 even when a high voltage is applied to the conductive member 18, and therefore the thickness of the head gasket 15 is set such that insulation resistance between the peripheral spark gap 13 and the cylinder head 3 and so on is greater than the insulation resistance of the peripheral spark gap 13, for example to 2 mm.

Figure 4:
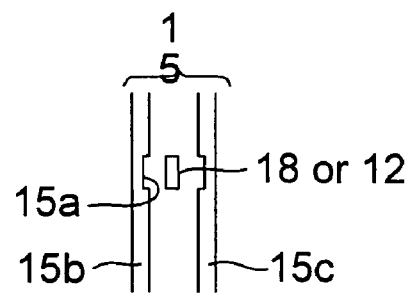
FIG. 4 is a view illustrating a method of manufacturing the head gasket.

As shown in FIG. 4, the head gasket 15 is manufactured by shaping glass wool using a water glass-form binder constituted by an inorganic substance such as silicon or zirconium to form a pair of plate-form members 15b, 15c in which a groove 15a corresponding to the shape of the conductive member 18 and the base portion of the peripheral electrode pair 12 is formed in at least one of the opposing surfaces thereof, and bonding the pair of plate-form members 15b, 15c together, with the conductive member 18 and the base portion of the peripheral electrode pair 12 accommodated in the groove 15a, using an incombustible, heat-resistant adhesive.

The head gasket 15 structured as described above may be formed integrally by burying the conductive member 18 and the base portion of the peripheral electrode pair 12 in the interior of the glass wool prior to shaping, and then shaping the entire gasket using a water glass-form binder.

With this structure, a high insulation resistance of at least 100 M Ω can be secured between the peripheral spark gap 13 and the cylinder head 3 and so on, even when the thickness of the head gasket 15 is approximately 2 mm, and hence leakage between the peripheral spark gap 13 and the cylinder head 3 and so on can be prevented.

It should be noted that the thickness of the head gasket 15 does not have to be uniform, and if necessary, around the opening portion of the cylinder 5 or on the periphery of water holes for transmitting cooling water, the head gasket 15 may be increased in thickness, coated with an adhesive, or provided with a beaded thin plate to enhance the sealing property thereof.

Next, an operation of the above multipoint ignition engine 1 will be described.

A homogeneous air-fuel mixture is introduced into the combustion chamber 2 from the intake port. In some cases, the air-fuel mixture is set at the stoichiometric air-fuel ratio or a smaller (richer) air-fuel ratio, but here, a lean air-fuel mixture having an excess air ratio of approximately 2 is used to improve the fuel efficiency. Having been introduced into the combustion chamber 2, the air-fuel mixture is ignited by applying a high-pressure secondary voltage to the central terminal 11 and peripheral terminal 20 such that sparks fly from the central spark gap 10 and the plurality of peripheral spark gaps 13.

Figure 5:
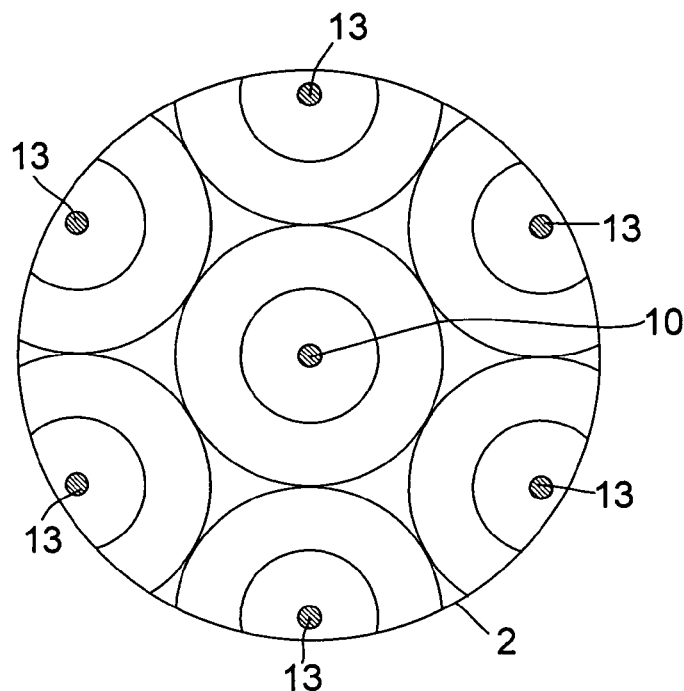
FIG. 5 is a view showing a state of flame propagation through the interior of a combustion chamber.

FIG. 5 shows a state of flame propagation in the combustion chamber 2 when the air-fuel mixture inside the combustion chamber 2 is ignited simultaneously by the central spark gap 10 and the plurality of peripheral spark gaps 13. The state of flame propagation inside the combustion chamber 2 may be checked by means of a combustion experiment using a fixed-volume container to which a transparent observation window has been attached.

The flames spread concentrically from the central spark gap 10 and the plurality of peripheral spark gaps 13. Furthermore, the flame from the central spark gap 10 propagates from the apex to the bottom portion of the combustion chamber 2, while the flames from the peripheral spark gaps 13 propagate from the bottom portion to the apex of the combustion chamber 2. As a result, the flame spreads throughout the combustion chamber 2 three-dimensionally, and therefore rapid combustion of the air-fuel mixture can be realized. This rapid combustion cannot be realized through conventional ignition using a single spark gap.

Furthermore, the unburned gas that is compressed between the central spark gap 10 and peripheral spark gaps 13 burns last, but this part is unlikely to be extinguished due to cooling, and therefore the air-fuel mixture in the combustion chamber 2 can be burned with almost no parts left unburned.

Hence, in the multipoint ignition engine 1 according to this invention, a sufficient combustion speed is obtained simply by performing ignition from the spark gaps 10, 13, and therefore there is no need to supplement the combustion speed using a gas flow generated by a squish or swirl, as in a conventional engine. A gas flow may rather increase cooling loss, and therefore, to ensure that a gas flow is not generated in the engine according to this invention, the combustion chamber 2 is preferably formed in a pent roof shape or a hemispherical shape having few corrugations on the wall surface thereof.

Figure 6:
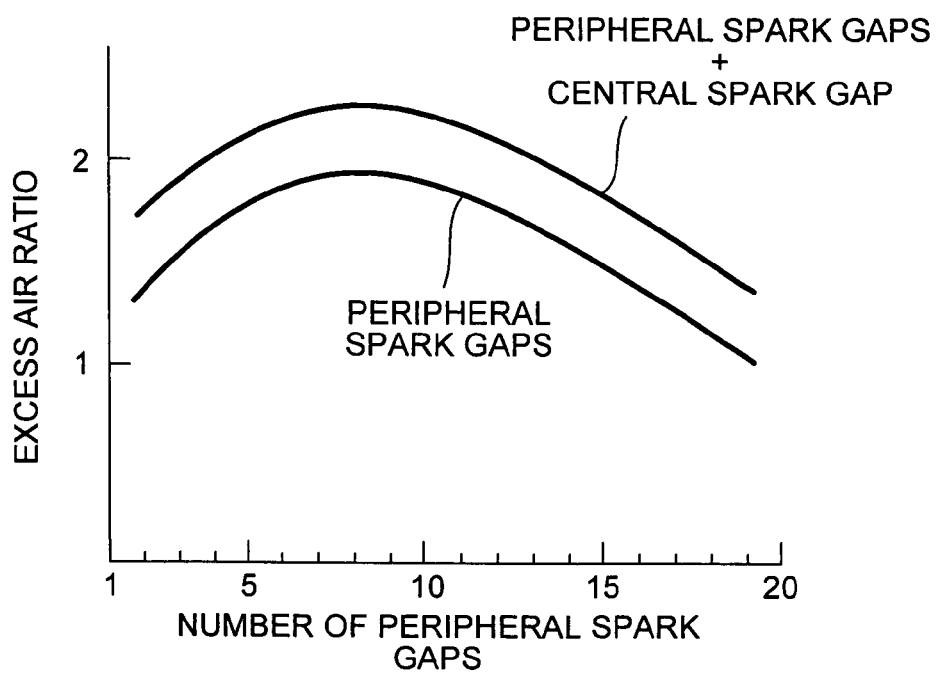
FIG. 6 is a view showing the relationship between the number of peripheral spark gaps and an upper limit of an excess air ratio (a lean limit).

FIG. 6 shows a comparison of excess air ratio upper limits (lean limits) when ignition is performed using only the peripheral spark gaps 13 and when ignition is performed using the central spark gap 10 in addition to the peripheral spark gaps 13. A partial load of 2,000 rpm, which corresponds to an operating condition when driving in an urban area, is set as an operating condition. As shown in FIG. 6, regardless of the number of peripheral spark gaps 13, driving can be performed at a higher excess air ratio when ignition is performed using both the central spark gap 10 and the peripheral spark gaps 13 than when ignition is performed using the peripheral spark gaps 13 alone.

It should be noted that here, the timing at which voltages are applied to the central terminal 11 and peripheral terminal 20 is synchronous, but preferably, a voltage is applied to the peripheral terminal 20 after a voltage is applied to the central terminal 11 such that ignition is performed from the central spark gap 10 first.

When a voltage is applied to the central terminal 11 first, unburned gas is compressed on the periphery of the combustion chamber 2 by the hot, high-pressure gas in the center, whereby the amount of heat generated upon ignition by the peripheral spark gaps 13 increases and the temperature of the unburned gas in the peripheral portion is raised by the radiation heat of the flame generated in the center. As a result, the effects of wall surface cooling decrease, lessening the risk of flame extinction, ignition delay, and so on in the peripheral portion of the combustion chamber 2, and hence stable combustion can be realized.

The phase difference is set at 5°, for example, but the phase difference may be varied in accordance with the operating conditions (rotation speed, load, air-fuel ratio, and so on) of the engine 1. For example, the phase difference is reduced at low speed and increased at high-speed, high-load. Depending on the shape of the combustion chamber 2, a reverse phase difference may be required.

It is believed that the ability to perform ignition substantially simultaneously in the plurality of peripheral spark gaps 13 is due to the fact that a minute capacitor is formed between the conductive member 18 and the cylinder head 3 or cylinder block 4, and the charge stored in this minute capacitor contributes to spark generation. More specifically, a minute capacitor is formed in the vicinity of each conductive member 18, and a charge is stored in each capacitor. Therefore, when discharge occurs in a certain peripheral spark gap 13, capacitance excess occurs in the load of the minute capacitor formed on the side to which the load flows as a result of the discharge, and hence a high voltage is also applied to the adjacent peripheral spark gap 13. Thus, discharge occurs in the form of a chain reaction.

Next, the actions and effects of this invention will be described.

According to the multipoint ignition engine 1 described above, the air-fuel mixture is ignited using both the central spark gap 10 and the plurality of peripheral spark gaps 13, and therefore the evenly mixed air-fuel mixture in the combustion chamber 2 can be burned rapidly, especially when the air-fuel mixture is lean. Since rapid combustion is possible, ignition can be performed at a timing that is closer to top dead center than that of a conventional engine, and therefore loss that is generated when the rising piston 6 is pushed back down by the explosion can be suppressed. As a result, the output and fuel efficiency of the engine 1 can be improved.

Further, combustion begins respectively from the central spark gap 10 and the plurality of peripheral spark gaps 13 such that the air-fuel mixture between the central spark gap 10 and peripheral spark gaps 13 burns last. However, this part is far from the wall surface of the combustion chamber 2, and therefore the flame is unlikely to be extinguished in this part. Hence, the air-fuel mixture in the combustion chamber 2 can be burned substantially completely, and the amount of discharged HC and CO can be reduced. Moreover, even during lean burn, the homogeneous air-fuel mixture can be burned rather than by means of stratified charge combustion, and it is therefore possible to burn an extremely lean air-fuel mixture in order to reduce NOx discharge. Hence, according to the multipoint ignition engine 1 described above, the discharge amounts of HC, CO, and NOx can all be reduced, enabling an improvement in the exhaust performance.

Moreover, variation in the combustion cycle is reduced, and the stability of the engine 1 is particularly improved during idling. Therefore, the flywheel can be reduced in weight, enabling a further improvement in fuel efficiency. In this case, the transient characteristic of the engine 1 is also improved, and therefore racing of the engine 1 during acceleration can be suppressed.

Furthermore, by providing the voltage application timing with a phase difference such that ignition by the central spark gap 10 occurs before ignition by the plurality of peripheral spark gas 13, the concentration of the unburned gas in the peripheral portion is increased by the high-pressure gas generated in the center, leading to an increase in the amount of heat generated upon ignition and an increase in the temperature of the unburned gas in the peripheral portion caused by the radiation heat from the center. As a result, ignition delay in the peripheral spark gaps 13 can be reduced, the flame is less likely to be cooled and extinguished on the wall surface, and the propagation speed of the flame from the periphery can be increased.

It should be noted that in this embodiment, six peripheral spark gaps 13 are disposed around the opening portion of the cylinder 5, but the number of peripheral spark gaps 13 is not limited to six, and if necessary, this number may be increased or decreased to obtain an optimum combustion state.

Further, the conductive member 18 and the base portion of the peripheral electrode pair 12 are held by the head gasket 15, but these components may be held in a spacer made of an insulating material, and a component obtained by sandwiching the spacer from above and below in the gasket may be held between the cylinder head 3 and cylinder block 4. However, the structure described above, in which the conductive member 18 and the base portion of the peripheral electrode pair 12 are held by the head gasket 15, is advantageous for raising the compression ratio of the engine 1.

Further, the engine 1 may be a direct injection engine rather than a premix engine. When fuel is injected into the combustion chamber 2 in the intake stroke, the fuel mixes with air introduced into the combustion chamber 2, and as the piston 6 approaches top dead center, a homogeneous air-fuel mixture can be formed in the combustion chamber 2.

Second Embodiment

To further improve the output and fuel efficiency of the multipoint ignition engine 1 described above, the compression ratio of the engine 1 may be raised by reducing the thickness of the head gasket 15. As the compression ratio rises, the thermal efficiency improves, leading to improvements in output and fuel efficiency. However, when the thickness of the head gasket 15 is reduced, the distance between the peripheral spark gap 13 and the cylinder head 3 and so on decreases, leading to an increase in the possibility of leakage. Leakage occurs particularly frequently when the thickness of the head gasket 15 is set at 6 mm or less. This applies similarly when the capacitance of the ignition coil is increased.

Figure 7:
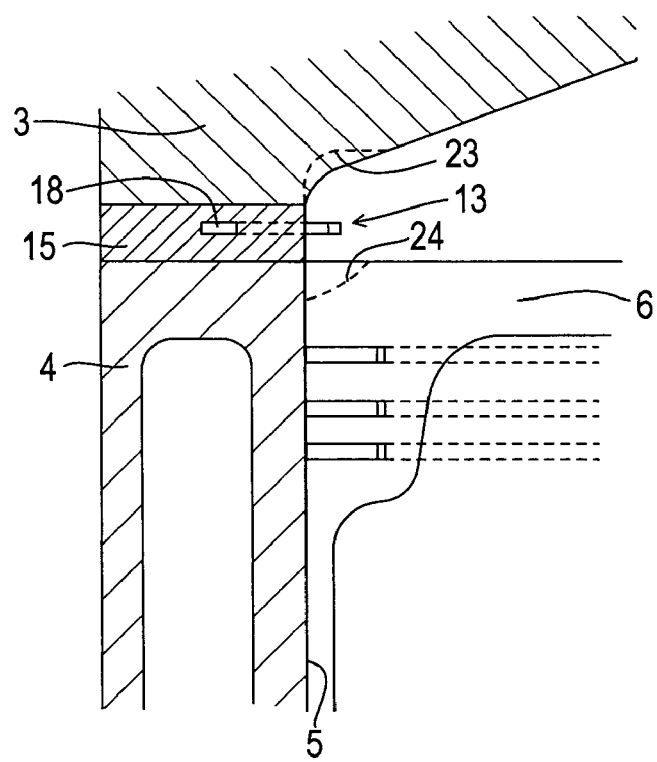
FIG. 7 is a view showing a second embodiment of this invention.
Figure 8:
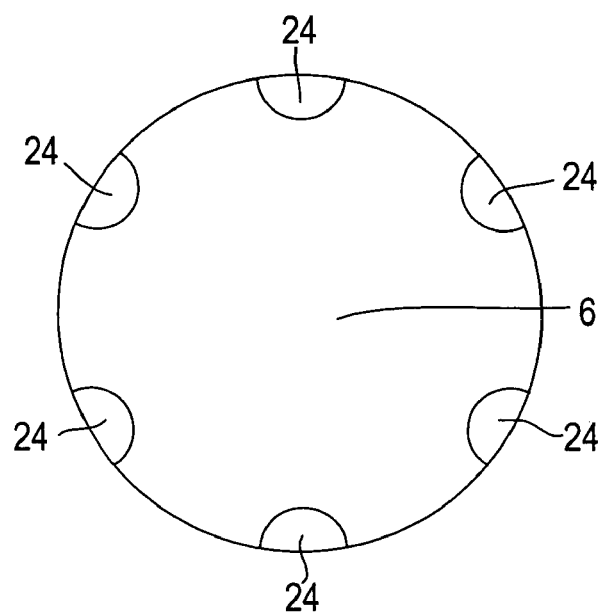
FIG. 8 is also a view of the second embodiment of this invention, showing an upper surface of a piston.

In the second embodiment, as shown in FIGS. 7 and 8, leakage from the peripheral spark gaps 13 to the cylinder head 3 and the crown surface of the piston 6 is suppressed by forming leakage-preventing indentations 23, 24 respectively in positions corresponding to the circumferential direction positions of the peripheral spark gaps 13 in the cylinder head 3 and the crown surface of the piston 6. All other structures are identical to the first embodiment.

Figure 9:
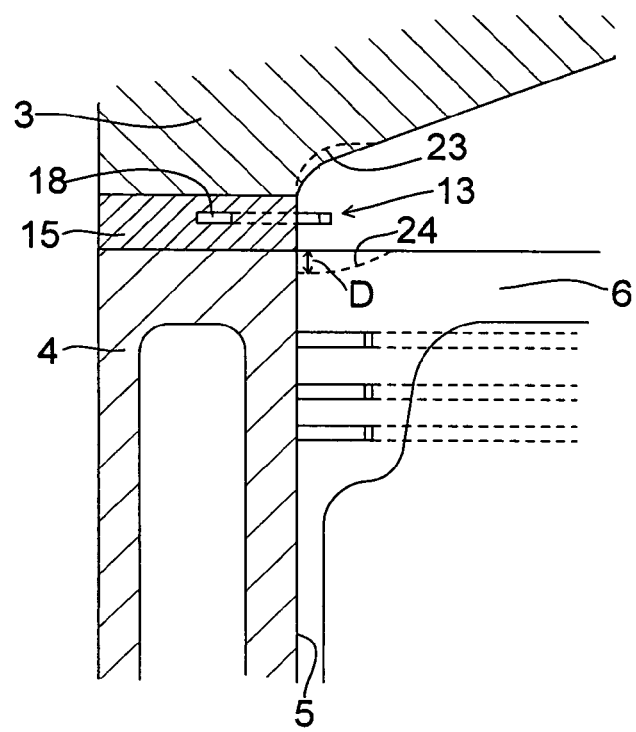
FIG. 9 is a view showing a partially modified example of the second embodiment of this invention.
Figure 10:
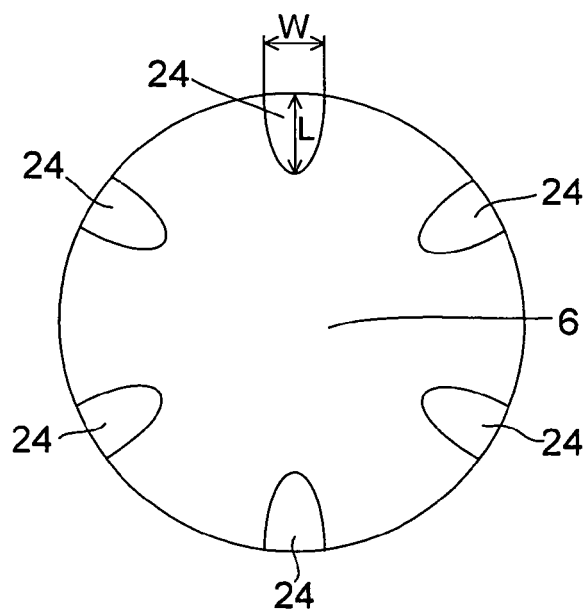
FIG. 10 is a view of the same partially modified example of the second embodiment of this invention, showing the upper surface of the piston.

As shown in FIGS. 9 and 10, the leakage-preventing indentations 23, 24 may be formed such that a length W in the radial direction of the cylinder 5 is smaller than a length L in the circumferential direction, and such that a depth D becomes steadily shallower toward the center of the cylinder 5. With this shape, the flames generated by the peripheral spark gaps 13 can be led to the center of the combustion chamber 2, and as the flames propagate to the center of the combustion chamber 2, they can be led to the apex of the combustion chamber 2, thereby enabling even more rapid combustion.

It should be noted that the leakage-preventing indentations are formed in both the cylinder head 3 and the crown surface of the piston 6, but when there is a possibility of leakage into only one of the cylinder head 3 and the crown surface of the piston 6, the leakage-preventing indentations may be formed in only one thereof.

Third Embodiment

To suppress leakage from the peripheral spark gaps 13 into the cylinder head 3 and so on, the third embodiment differs from the first embodiment in the structure of the peripheral electrode pair 12. All other structures are identical to the first embodiment.

Figure 11:
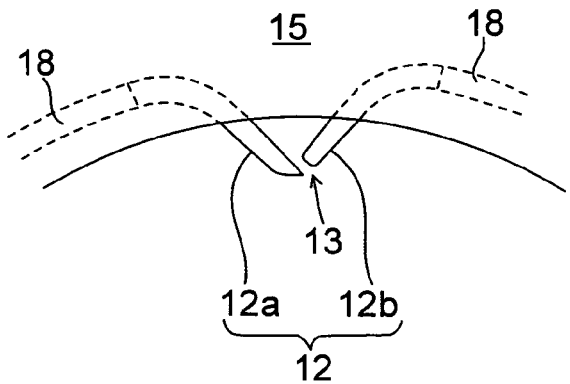
FIG. 11 is a view showing a third embodiment of this invention.

FIG. 11 shows the structure of the peripheral electrode pair 12 according to the third embodiment. The part of the peripheral electrode pair 12 that is exposed to the interior of the combustion chamber 2 takes a linear rod form and does not have a curved portion midway. Further, the peripheral spark gap 13 is formed by causing the tip end surface of one of the electrodes (the earth electrode 12b) constituting the peripheral electrode pair 12 to face the tip end-side side face of the other electrode (the conducting electrode 12a), with a gap therebetween. The angle formed by the exposed parts of the electrodes 12a, 12b is substantially 90°.

With this structure, the likelihood of leakage from a midway point on the peripheral electrode pair 12 decreases since there is no curved portion midway on the peripheral electrode pair 12, and hence leakage from the peripheral spark gap 13 to the cylinder head 3 and so on can be suppressed.

Furthermore, with this structure heat resistance increases even when the thickness of the peripheral electrode pair 12 is reduced. Also, the interval of the peripheral spark gap 13 does not widen dramatically even when the tip ends of the peripheral electrode pair 12 deteriorate, and hence the life of the peripheral electrode pair 12 can be extended.

It should be noted that here, the peripheral spark gap 13 is formed by causing the tip end surface of the earth electrode 12b to face the tip end-side side face of the conducting electrode 12a, but the peripheral spark gap 13 may be formed by causing the tip end surface of the conducting electrode 12a to face the tip end-side side face of the earth electrode 12b.

Fourth Embodiment

Similarly to the third embodiment, the fourth embodiment differs from the first embodiment in the structure of the peripheral electrode pair 12 to suppress leakage from the peripheral spark gaps 13 into the cylinder head 3 and so on. All other structures are identical to the first embodiment.

Figure 12:
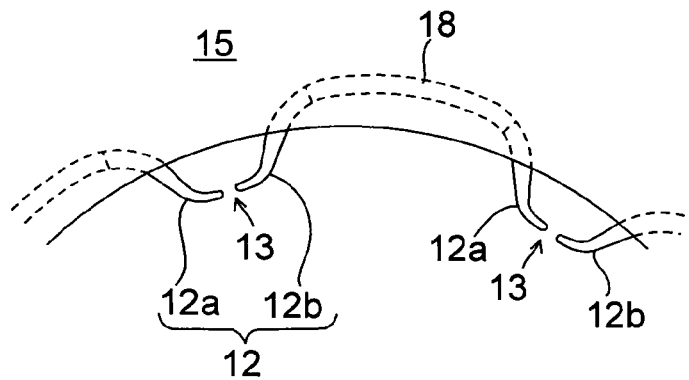
FIG. 12 is a view showing a fourth embodiment of this invention.

FIG. 12 shows the structure of the peripheral electrode pair 12 according to the fourth embodiment. All of the peripheral electrode pairs 12 take a gently curved S shape. The peripheral spark gap 13 is formed by causing the tip end surface of the earth electrode 12b constituting the peripheral electrode pair 12 to face the tip end surface of the conducting electrode 12a, with a gap therebetween.

With this structure, the likelihood of leakage from a midway point on the peripheral electrode pair 12 into the cylinder head 3 and so on can be reduced as there is no sharply curved portion midway on the peripheral electrode pair 12.

Fifth Embodiment

Similarly to the third embodiment, the fifth embodiment differs from the first embodiment in the shape of the peripheral electrode pair 12 and the head gasket 15 to suppress leakage from the peripheral spark gaps 13 into the cylinder head and so on. All other structures are identical to the first embodiment.

Figure 13:
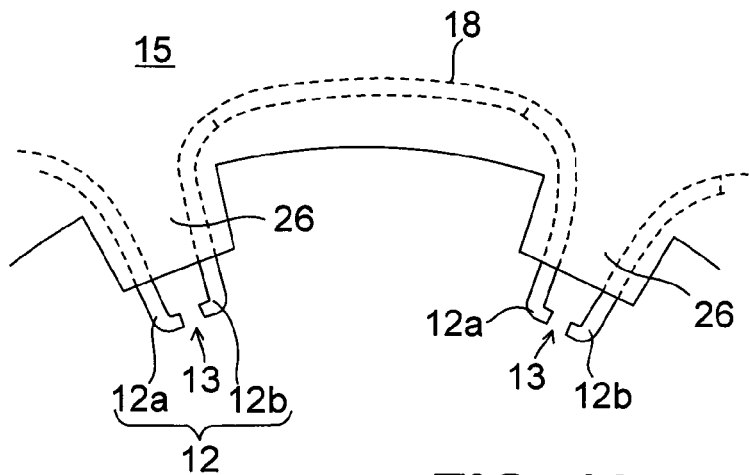
FIG. 13 is a view showing a fifth embodiment of this invention.

As shown in FIG. 13, in the fifth embodiment, the part of the head gasket 15 that holds the base portion of the peripheral electrode pair 12 protrudes into the inside of the combustion chamber 2 (into the opening portion of the head gasket 15). The peripheral spark gap 13 is formed by causing the tip end surface of the earth electrode 12b constituting the peripheral electrode pair 12 to face the tip end surface of the conducting electrode 12a, with a gap therebetween, and the radius of a circle passing through the peripheral spark gaps 13 is smaller than the radius of the cylinder 5.

With this structure, the distance from the peripheral spark gap 13 to the cylinder head 3 and so on increases, and therefore leakage from the peripheral spark gap 13 into the cylinder head 3 and so on can be suppressed.

Sixth Embodiment

Similarly to the third embodiment, the sixth embodiment differs from the first embodiment in the structure of the peripheral electrode pair 12 to suppress leakage from the peripheral spark gaps 13 into the cylinder head and so on. Also, the top dead center position of the piston 6 is raised above that of the first embodiment. All other structures are identical to the first embodiment.

Figure 14:
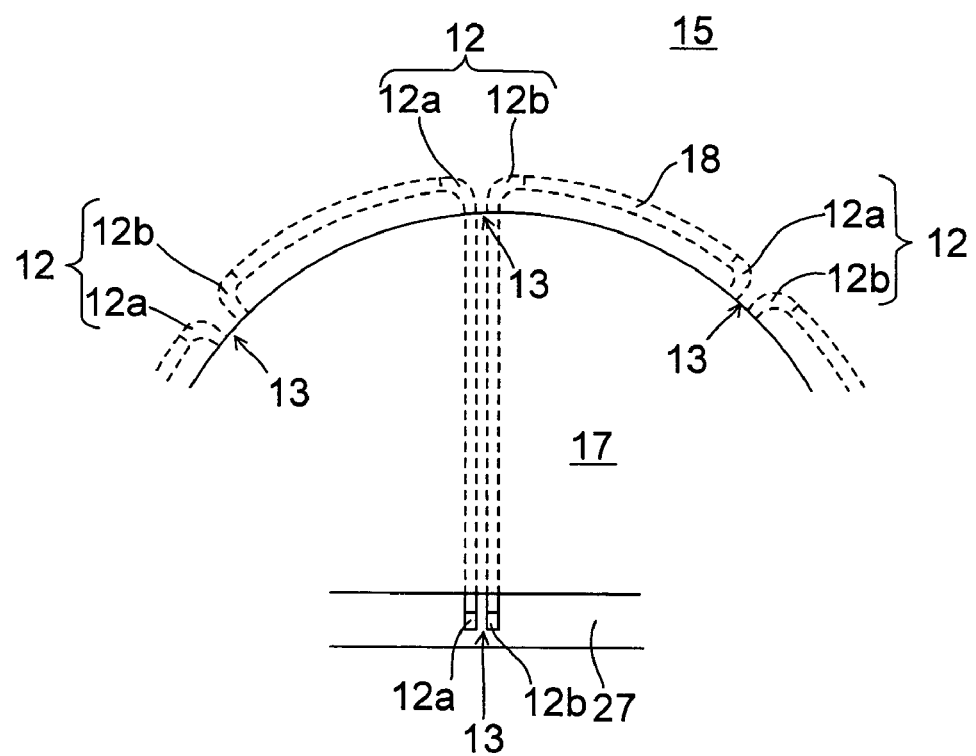
FIG. 14 is a view showing a sixth embodiment of this invention.

FIG. 14 shows the structure of the peripheral electrode pair 12 according to the sixth embodiment. The tip end surfaces of the peripheral electrode pair 12 are exposed to the opening portion in the cylinder 5, but do not protrude therein, and instead are flush with an inner peripheral surface 27 of the opening portion 17 in the head gasket 15. The peripheral spark gap 13 is formed between the tip end surface of the conducting electrode 12a and the tip end surface of the earth electrode 12b, which together constitute the peripheral electrode pair 12, and the radius of a circle passing through the peripheral spark gaps 13 is equal to the radius of the cylinder 5.

With this structure, the spark from the peripheral electrode pair 12 flies along the inner peripheral surface 27 of the opening portion 17 in the head gasket 15, thereby generating surface discharge, and as a result, leakage from the peripheral spark gap 13 into the cylinder head 3 and so on can be suppressed. In an experiment conducted by the applicant, leakage into the cylinder head and so on did not occur when platinum electrodes having a 0.4 mm square were buried in a head gasket having a thickness of 4 mm at an interval of 0.4 mm and discharge was performed.

Moreover, the piston 6 and peripheral electrode pair 12 do not interfere with each other, and therefore the top dead center position of the piston 6 can be set at a higher position than the peripheral spark gap 13. As a result, the compression ratio of the engine 1 can be raised further, enabling further improvements in the output and fuel efficiency of the engine 1.

It should be noted that with this structure, when the air-fuel mixture is rich and the internal temperature of the cylinder 5 is low, for example during an idling operation when the engine 1 is cold, carbon may adhere to the inner peripheral surface 27 of the opening portion 17 in the head gasket 15, leading to smoldering. However, by performing ignition using the central spark gap 10 as well, the adhered carbon can be burned, and hence leakage from the peripheral spark gaps 13 into the cylinder head 3 and so on caused by the adhered carbon can be suppressed.

Seventh Embodiment

Similarly to the third embodiment, the seventh embodiment differs from the first embodiment in the structure of the peripheral electrode pair 12 to suppress leakage from the peripheral spark gaps 13 into the cylinder head 3 and so on. Also, the top dead center position of the piston 6 is raised above that of the first embodiment. All other structures are identical to the first embodiment.

Figure 15:
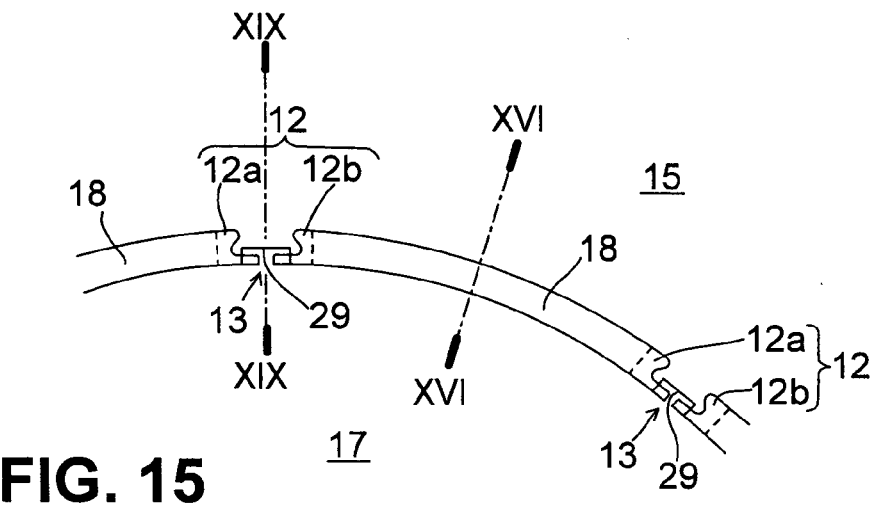
FIG. 15 is a view showing a seventh embodiment of this invention.

FIG. 15 shows the structure of the peripheral electrode pair 12 according to the seventh embodiment. Recessed portions 29 are formed respectively in circumferential direction positions corresponding to the peripheral spark gaps 13 in the inner peripheral surface 27 of the opening portion 17 in the head gasket 15, and the tip ends of the peripheral electrode pairs 12 are respectively exposed to the recessed portions 29. The peripheral spark gap 13 is formed by causing the tip end surface of the earth electrode 12b constituting the peripheral electrode pair 12 to face the tip end surface of the conducting electrode 12a, with a gap therebetween, and the radius of a circle passing through the peripheral spark gaps 13 is substantially equal to the radius of the cylinder 5.

Figure 16:
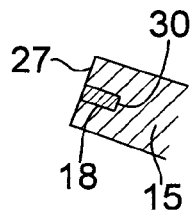
FIG. 16 is a XVI-XVI sectional view of FIG. 15.
Figure 17:
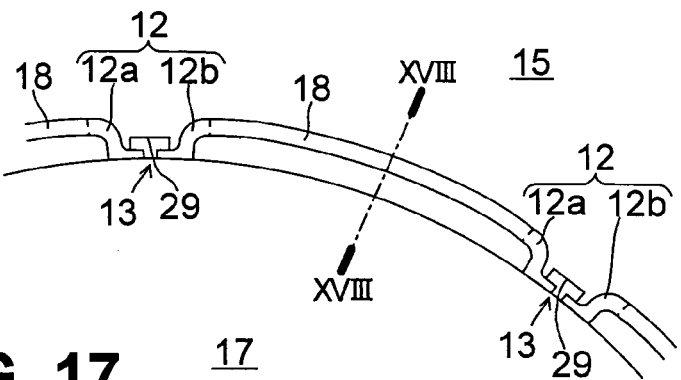
FIG. 17 is a view showing a partially modified example of the seventh embodiment of this invention.
Figure 18:
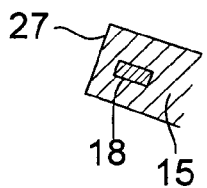
FIG. 18 is a XVIII-XVIII sectional view of FIG. 17.

As shown in FIG. 16, the conductive member 18 joined to the base portion of the peripheral electrode pair 12 is accommodated in and held by a groove 30 formed in the inner peripheral surface 27 of the opening portion 17 in the head gasket 15, and a side face thereof is exposed onto the inner peripheral surface 27. As shown in FIGS. 17 and 18, the conductive member 18 may be buried in the head gasket 15, similarly to the embodiments described heretofore.

Figure 19:
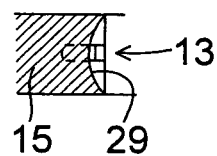
FIG. 19 is a XIX-XIX sectional view of FIG. 15.
Figure 20:
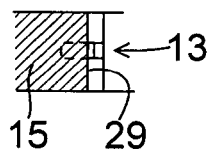
FIG. 20 is a view showing a partially modified example of the seventh embodiment of this invention.

As shown in FIG. 19, the recessed portion 29 is formed to become steadily shallower from the deepest part thereof in the center of the thickness direction of the head gasket 15 (corresponding to the position from which the peripheral electrode pair protrudes) toward the upper end and lower end of the head gasket 15. Alternatively, to facilitate processing, the recessed portion 29 may be formed at a uniform depth in the thickness direction of the head gasket 15, as shown in FIG. 20.

Figure 21:
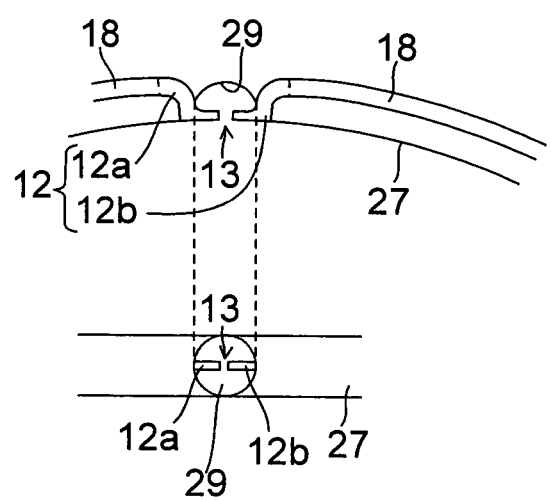
FIG. 21 is a view showing a partially modified example of the seventh embodiment of this invention.

Further, as shown in FIG. 21, the recessed portion 29 may be formed in a hemispherical shape in a circumferential direction position corresponding to the peripheral spark gap 13. With this structure, the capacity of the recessed portion 29 can be reduced to a minimum, and therefore reductions in the strength and air-tightness of the head gasket 15 caused by formation of the recessed portions can be suppressed.

Hence, in the seventh embodiment, the recessed portion 29 is formed in the back surface of the peripheral spark gap 13 such that the peripheral spark gap 13 is exposed to combustion gas, and as a result, carbon can be prevented from adhering to the peripheral spark gap 13. Accordingly, leakage caused by carbon adhesion to the peripheral spark gap 13 can be suppressed even further.

Eighth Embodiment

In the eighth embodiment, the peripheral spark gaps 13 are divided into a plurality of groups, the peripheral spark gaps 13 in each group are electrically connected by the conductive members 18, and an ignition coil 31 is connected to one end of each of the serially connected groups of peripheral spark gaps 13.

Figure 22:
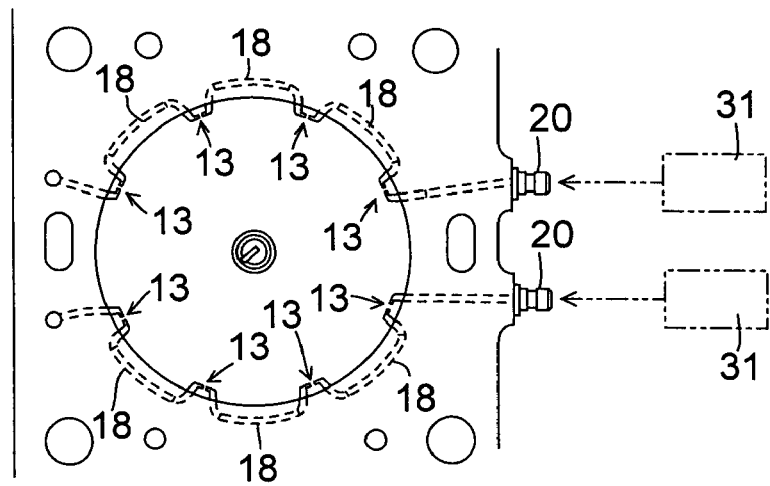
FIG. 22 is a view showing an eighth embodiment of this invention.

In the example shown in FIG. 22, the peripheral spark gaps 13 are divided into two groups, and an ignition coil is connected to the peripheral terminal 20 of each group. With this structure, the energy required by a single ignition coil can be reduced, and the voltage that is applied to the peripheral spark gap 13 closest to the ignition coil can be lowered. As a result, leakage can be, suppressed.

Figure 23:
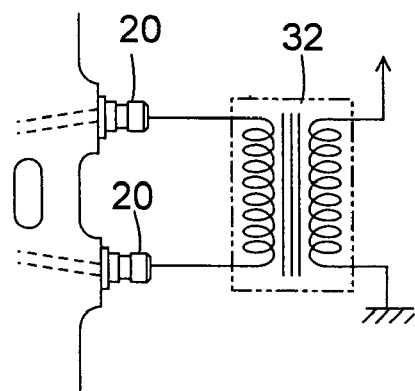
FIG. 23 is a view showing a partially modified example of the eighth embodiment of this invention.

It should be noted that here, two independent ignition coils 31 are provided, but instead, a twin-headed ignition coil 32 may be provided, as shown in FIG. 23, and the two groups of peripheral spark gaps 13 may be connected thereto.

Also, the peripheral spark gaps 13 are divided into two groups here, but when a large number of peripheral spark gaps 13 are provided, they may be divided into three or more groups.

Ninth Embodiment

Figure 24:
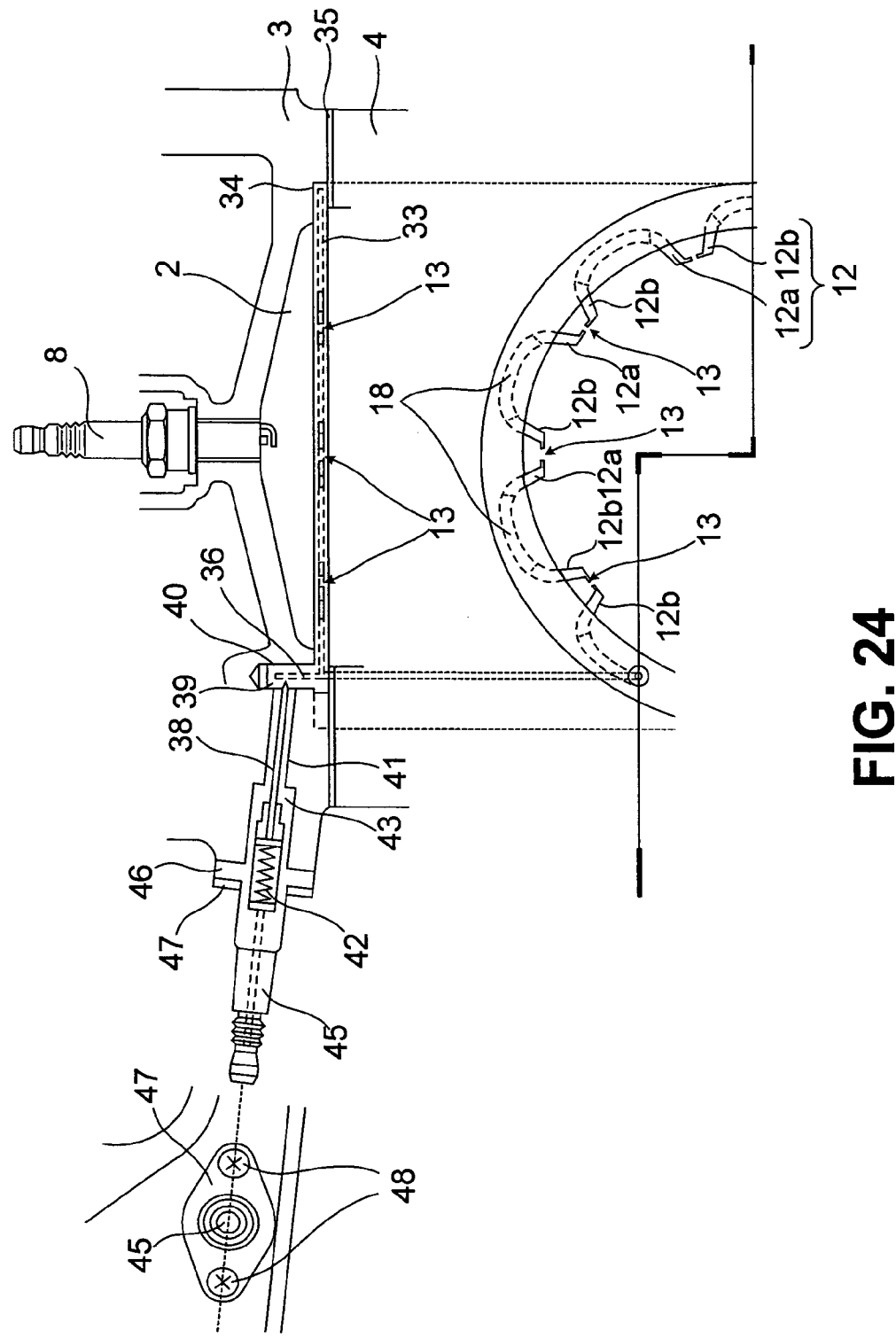
FIG. 24 is a view showing a ninth embodiment of this invention.

FIG. 24 shows a ninth embodiment. The ninth embodiment differs from the first embodiment in that the conductive member 18 and the base portion of the peripheral electrode pair 12 are buried in an ignition ring 33 constituted separately from the head gasket 15, and the ignition ring 33 is accommodated in a shallow counter bore portion 34 provided in a position corresponding to the opening portion of the cylinder 5 in at least one of the lower surface of the cylinder head 3 and the upper surface of the cylinder block 4. Thus, the plurality of spark gaps 13 are disposed around the opening portion of the cylinder 5.

In this example, the counter bore portion 34 is formed in the lower surface of the cylinder head 3, and the depth of the counter bore portion 34 is set such that the lower surface of the ignition ring 33 is equal in height to the lower surface of the cylinder head 3. The cylinder head 3 and cylinder block 4 are connected with the ignition ring 33 accommodated in the counter bore portion 34 and an identical head gasket 35 to the pre-existing head gasket of the engine sandwiched between the cylinder head 3 and cylinder block 4.

The ignition ring 33 is formed from an insulating silicon-based ceramic or the like that holds the conductive member 18 and the base portion of the peripheral electrode pair 12 and is fired in this state. Similarly to the head gasket 15 of the previous embodiments, the ignition ring 33 may be formed by holding the conductive member 18 and the base portion of the peripheral electrode pair 12 between two annular members made of an insulating material, and then bonding the two annular members made of an insulating material together using an incombustible, heat-resistant adhesive.

The thickness of the ignition ring 33 is identical to that of the head gasket 15 of the previous embodiments, and is set to a value at which the required insulating resistance between the peripheral spark gap 13 and the cylinder head 3 and so on can be secured.

By providing the insulating member (the ignition ring 33), in which the conductive member 18 and the base portion of the peripheral electrode pair 12 are buried, separately to the head gasket 35 in this manner, a conventional head gasket can be used without modification as the head gasket 35. Moreover, the qualities required of the insulating member, for example durability, strength, insulating performance, and so on, can be adjusted to optimum values with greater precision.

Figure 25:
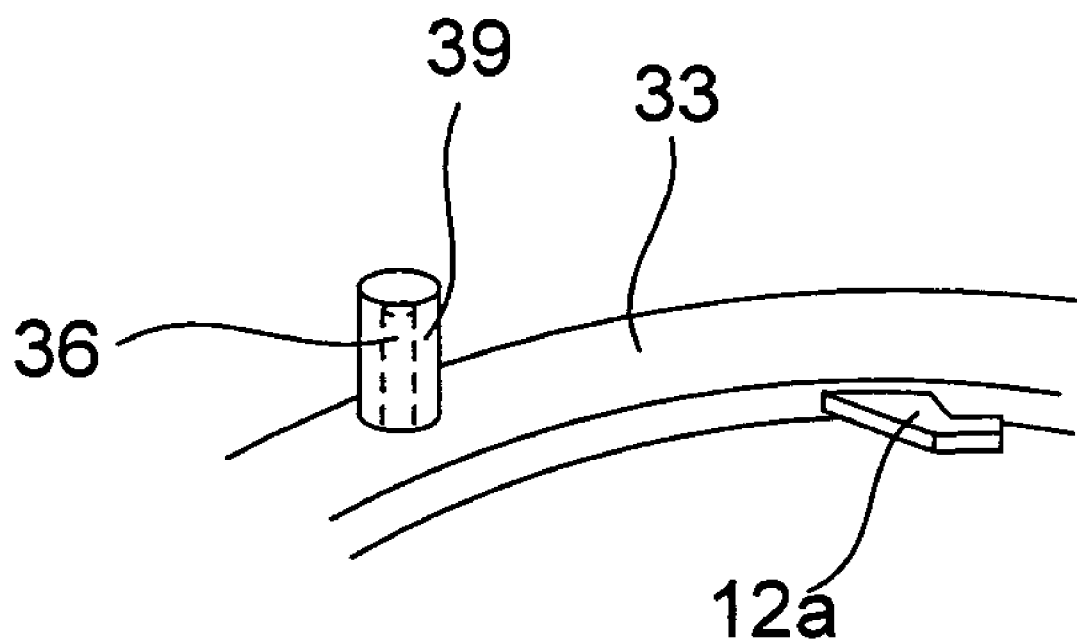
FIG. 25 is also a view of the ninth embodiment of this invention, showing the structure of a power-receiving pin of an ignition ring.

Also in the ninth embodiment, as shown in FIG. 25, a power-receiving pin 36 extending to the upper side of the cylinder 5 in the axial direction is formed on the upper surface of the conductive member 18 positioned furthest toward the leading end side so as to protrude to the upper side of the cylinder 5 in the axial direction from the upper surface of the ignition ring 33. The periphery of the power-receiving pin 36, excluding a location against which a conductive needle 38 to be described below is pressed, is covered by an insulating material 39 so that leakage does not occur between the power-receiving pin 36 and the cylinder head 3. As shown in FIG. 24, a pin-accommodating hole 40 is formed in the lower surface of the cylinder head 3, and when the cylinder head 3 is connected to the cylinder block 4, the power-receiving pin 36 is fitted into the pin-accommodating hole 40.

Further, a through hole 41 connecting the pin-accommodating hole 40 to the outside surface of the cylinder head 3 is formed in the cylinder head 3, and through the through hole 41, the conductive needle 38 is biased by a spring 42 so as to be pressed against the power receiving pin 36. An insulating material 43 is filled between the conductive needle 38 and the inner wall of the through hole 41 to ensure that leakage does not occur between the conductive needle 38 and the cylinder head 3. By interposing the spring 42 on the conduction path, variation in the dimensions of the structural components of the engine 1 caused by thermal expansion can be absorbed through the expansion and contraction of the spring 42.

A terminal 45 is formed on the base end side of the conductive needle 38. The conductive needle 38 and spring 42 are accommodated in a holder 46 made of an insulating material, and the holder 46 is fixed by screwing a flange portion 47 to the cylinder head 3 using machine screws 48. When resistance is to be inserted to suppress radio wave noise, the resistance is preferably inserted between the spring 42 and the terminal 45.

Here, the power-receiving pin 36 extends from the ignition ring 33 to the axial direction upper side of the cylinder, while the pin-accommodating hole 40 accommodating the power-receiving pin 36 and the through hole 41 accommodating the conductive needle 38, which supplies a voltage to the power-receiving pin 36, are formed in the cylinder head 3. However, the power-receiving pin 36 may extend to the axial direction lower side of the cylinder 5, and the pin-accommodating hole 40 and through hole 41 may be formed in the cylinder block 4.

Embodiments of this invention were described above, but these embodiments may be implemented in appropriate combinations.

What is claimed is:

1. A multipoint ignition engine, comprising:
    a cylinder head having a combustion chamber formed on a bottom surface thereof;
    a cylinder block having a cylinder in a position opposing the combustion chamber;
    a piston accommodated in the cylinder;
    a central electrode pair, disposed in a center of the combustion chamber, for forming a central spark gap; and
    a plurality of peripheral electrode pairs held in an insulating member, which has an opening portion having a substantially equal diameter to an opening portion of the cylinder in a position corresponding to the opening portion in the cylinder, for forming a plurality of peripheral spark gaps around an inner periphery of the opening portion in the cylinder,
    wherein an air-fuel mixture in the combustion chamber, which is obtained by mixing together fuel and air evenly, is ignited using both the central spark gap and the plurality of peripheral spark gaps, and
    wherein a voltage is applied to the peripheral electrode pairs after a voltage is applied to the central electrode pair, so that ignition by the peripheral spark gaps occurs after ignition by the central spark gap.

2. The multipoint ignition engine as defined in claim 1, wherein the multipoint ignition engine is a premix engine that generates a homogeneous air-fuel mixture by mixing fuel that is injected into an intake port with air, and introduces the air-fuel mixture into the combustion chamber.

3. The multipoint ignition engine as defined in claim 1, wherein the multipoint ignition engine is a direct injection engine that generates a homogeneous air-fuel mixture in the combustion chamber by injecting fuel into the combustion chamber during an intake stroke.

4. The multipoint ignition engine as defined in claim 1, wherein the plurality of peripheral spark gaps are disposed at equal circumferential direction intervals around the inner periphery of the opening portion in the cylinder.

5. The multipoint ignition engine as defined in claim 1, wherein all of the plurality of peripheral electrode pairs are electrically connected in series by conductive members, and
    a voltage application device is provided for applying a voltage to one end of the serially connected plurality of peripheral electrode pairs.

6. The multipoint ignition engine as defined in claim 5, further comprising:
    a power-receiving member connected electrically to one end of the serially connected plurality of peripheral electrode pairs; and
    a rod-form member inserted into a through hole so as to contact the power-receiving member, the through hole extending from an outside surface of the cylinder head or the cylinder block to the power-receiving member;
    wherein the voltage application device supplies the voltage from the voltage application device to the plurality of peripheral electrode pairs via the rod-form member.

7. The multipoint ignition engine as defined in claim 5, wherein the plurality of peripheral electrode pairs and the conductive members are formed from different materials.

8. The multipoint ignition engine as defined in claim 7, wherein a heat value of an ignition device comprising the plurality of peripheral electrode pairs is adjusted by modifying at least one of a length, a thickness, a width, and a material of the conductive members.

9. The multipoint ignition engine as defined in claim 1, wherein the plurality of peripheral electrode pairs are divided into a plurality of groups,
    the plurality of peripheral electrode pairs in each of the groups are electrically connected in series by conductive members, and
    a voltage application device is provided for applying a voltage to one end of the serially connected plurality of peripheral electrode pairs in each of the groups.

10. The multipoint ignition engine as defined in claim 9, further comprising:
    a power-receiving member connected electrically to one end of the serially connected plurality of peripheral electrode pairs; and
    a rod-form member inserted into a through hole so as to contact the power-receiving member, the through hole extending from an outside surface of the cylinder head or the cylinder block to the power-receiving member;
    wherein the voltage application device supplies the voltage from the voltage application device to the plurality of peripheral electrode pairs via the rod-form member.

11. The multipoint ignition engine as defined in claim 9, wherein the plurality of peripheral electrode pairs and the conductive members are formed from different materials.

12. The multipoint ignition engine as defined in claim 11, wherein a heat value of an ignition device comprising the plurality of peripheral electrode pairs is adjusted by modifying at least one of a length, a thickness, a width, and a material of the conductive members.

13. The multipoint ignition engine as defined in claim 1, wherein the insulating member is a head gasket sandwiched between the cylinder head and the cylinder block.

14. The multipoint ignition engine as defined in claim 13, wherein the insulating member is formed by bonding together two plates made of an insulating material, and
a base portion of each of the plurality of peripheral electrode pairs is accommodated and held in a recessed groove formed in at least one of the two plates.

15. The multipoint ignition engine as defined in claim 1, wherein a counter bore portion is formed in at least one of the cylinder head and the cylinder block in a position corresponding to the opening portion in the cylinder, and
the insulating member is an annular member accommodated in the counter bore portion.

16. The multipoint ignition engine as defined in claim 15, wherein the insulating member is formed by bonding together two plates made of an insulating material, and
a base portion of each of the plurality of peripheral electrode pairs is accommodated and held in a recessed groove formed in at least one of the two plates.

17. The multipoint ignition engine as defined in claim 1, wherein a radius of a circle passing through the plurality of peripheral spark gaps is equal to a radius of the opening portion in the cylinder.

18. The multipoint ignition engine as defined in claim 17, wherein a top dead center position. of the piston is set in a higher position than the peripheral spark gap.

19. The multipoint ignition engine as defined in claim 17, wherein a tip end surface of the peripheral electrode pair is flush with an inner peripheral surface of the opening portion in the insulating member.

20. The multipoint ignition engine as defined in claim 17, wherein recessed portions are formed in the inner peripheral surface of the opening portion in the insulating member in positions respectively facing the plurality of peripheral spark gaps, and the plurality of peripheral spark gaps are exposed from the respectively corresponding recessed portions.

21. The multipoint ignition engine as defined in claim 1, wherein a radius of a circle passing through the plurality of peripheral spark gaps is smaller than a radius of the cylinder.

22. The multipoint ignition engine as defined in claim 21, wherein at least a part of the plurality of peripheral electrode pairs that protrudes into the combustion chamber takes a linear rod form, and
the peripheral spark gap is formed by causing an end surface of one of the electrodes constituting the peripheral electrode pair to face a side face of the other electrode with a gap therebetween.

23. The multipoint ignition engine as defined in claim 21, wherein the plurality of peripheral electrode pairs are constituted by S-shaped electrodes, and
the peripheral spark gap is formed by causing tip ends of the electrodes constituting the peripheral electrode pair to face each other.

24. The multipoint ignition engine as defined in claim 21, wherein a part of the insulating member that holds the plurality of peripheral electrode pairs protrudes into an inner side of the combustion chamber.

25. The multipoint ignition engine as defined in claim 1, wherein leakage-preventing indentations are formed in a crown surface of the piston in positions corresponding to respective circumferential direction positions of the plurality of peripheral spark gaps.

26. The multipoint ignition engine as defined in claim 25, wherein a length of the leakage-preventing indentation in a radial direction of the cylinder is greater than a length thereof in a circumferential direction of the cylinder.

27. The multipoint ignition engine as defined in claim 1, wherein leakage-preventing indentations are formed in the cylinder head in positions corresponding to the respective circumferential direction positions of the plurality of peripheral spark gaps.

28. The multipoint ignition engine as defined in claim 27, wherein a length of the leakage-preventing indentation in a radial direction of the cylinder is greater than a length thereof in a circumferential direction of the cylinder.

29. An ignition device for a multipoint ignition engine, comprising:
a plurality of peripheral electrode pairs held in an insulating member interposed between a cylinder head and a cylinder block of the engine, the plurality of peripheral electrode pairs forming a plurality of peripheral spark gaps around an inner periphery of the opening portion in a cylinder of the engine; and
conductive members buried in the insulating member, the conductive members being connected to the plurality of peripheral electrode pairs,
wherein a heat value of the ignition device is adjusted by modifying at least one of a length, a thickness, a width, and a material of the conductive members.

30. An ignition device as defined in claim 29, wherein the insulating member is a head gasket sandwichable between the cylinder head and the cylinder block.

31. An ignition device as defined in claim 29, wherein the insulating member is formed by bonding together two plates made of an insulating material, and
a base portion of each of the plurality of peripheral electrode pairs is accommodated and held in a recessed groove formed in at least one of the two plates.

32. An ignition device as defined in claim 29, wherein the plurality of peripheral electrode pairs are electrically connected in series by the conductive members.

33. A heat value adjusting method for an ignition device for a multipoint ignition engine, the ignition device comprising:
a plurality of peripheral electrode pairs held in an insulating member interposed between a cylinder head and a cylinder block of the engine, the plurality of peripheral electrode pairs forming a plurality of peripheral spark gaps around an inner periphery of the opening portion in a cylinder of the engine; and
conductive members buried in the insulating member, the conductive members being connected to the plurality of peripheral electrode pairs,
the method comprising adjusting a heat value of the ignition device by modifying at least one of a length, a thickness, a width, and a material of the conductive members.

* * * * *

UNITED STATES PATENT AND TRADEMARK OFFICE
CERTIFICATE OF CORRECTION

PATENT NO.       : 7,661,402 B2                              Page 1 of 1
APPLICATION NO. : 11/640992
DATED            : February 16, 2010
INVENTOR(S)      : Katsuaki Minami It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 62 days.

Signed and Sealed this

Thirtieth Day of November, 2010

David J. Kappos
*Director of the United States Patent and Trademark Office*